United States Patent [19]

Cleary

[11] Patent Number: 4,476,284

[45] Date of Patent: Oct. 9, 1984

[54] POLYMER COMPOSITIONS AND PROCESS

[75] Inventor: James W. Cleary, Bartlesville, Okla.

[73] Assignee: Phillips Petroleum Company, Bartlesville, Okla.

[21] Appl. No.: 496,786

[22] Filed: May 20, 1983

[51] Int. Cl.³ .............................................. C08L 53/00
[52] U.S. Cl. ........................................ 525/92; 525/96; 525/189; 525/343; 525/537; 528/265; 528/373; 528/388
[58] Field of Search ................. 525/92, 189, 537, 343, 525/96; 528/265, 373, 388

[56] References Cited

U.S. PATENT DOCUMENTS

| | | | |
|---|---|---|---|
| 3,354,129 | 11/1967 | Edmonds, Jr. et al. | 528/265 |
| 3,919,177 | 11/1975 | Campbell | 528/373 |
| 4,020,054 | 4/1977 | Fodor | 260/23.7 M |
| 4,021,596 | 5/1977 | Bailey | 428/375 |
| 4,066,632 | 1/1978 | Anderson et al. | 528/373 |
| 4,139,574 | 2/1979 | Cooper et al. | 260/836 |
| 4,256,853 | 3/1981 | Naylor et al. | 525/92 |

FOREIGN PATENT DOCUMENTS

| | | | |
|---|---|---|---|
| 118449 | 9/1981 | Japan | 525/92 |
| 56-118456 | 9/1981 | Japan . | |

Primary Examiner—Melvyn I. Marquis
Attorney, Agent, or Firm—Mark A. Montgomery

[57] ABSTRACT

Poly(arylene sulfide) compositions and process comprising producing poly(arylene sulfide) in the presence of a thermoplastic elastomeric hydrogenated conjugated diene/monovinyl arene block copolymer present in an amount sufficient to improve the physical properties of the composition.

20 Claims, No Drawings

POLYMER COMPOSITIONS AND PROCESS

This invention relates to compositions of matter containing poly(arylene sulfide) having improved physical properties and processes of making said compositions of matter. In accordance with another aspect, this invention relates to a process for the preparation of arylene sulfide polymer compositions by adding to the reactants that produce poly(arylene sulfide), prior to polymerization a thermoplastic hydrogenated conjugated diene/monovinyl arene block copolymer (also called diene/monovinyl aromatic block copolymer).

Aromatic sulfide polymers ranging in consistency from viscous liquid to crystalline solids are known. While such polymers exhibit desirable properties for many applications, considerable research has been extended to find methods of improving the properties and versatility of arylene sulfide polymers for various applications. The present invention is directed to a process and composition resulting from the process of a polymerization carried out in the presence of a thermoplastic hydrogenated conjugated diene/monovinyl arene block copolymer to yield a polymeric product having improved tensile strength, impact resistance, and flexural modulus.

Accordingly, an object of this invention is to improve the physical properties of poly(arylene sulfide) resins. A further object of the invention is to provide economically advantageous compositions based on poly(arylene sulfide).

A further object of the invention is to provide a process for the preparation of arylene sulfide polymers that exhibit improved physical properties.

A further object of the invention is to provide a polymer composition having improved tensile strength.

A further object of the invention is to provide a polymer composition having improved impact resistance.

A further object of the invention is to provide a polymer composition having improved flexural modulus.

Other aspects, objects and the various advantages of this invention will become apparent upon a study of the specification and the appended claims.

In accordance with the invention, an improved process is provided for producing poly(arylene sulfide) polymers exhibiting improved physical properties wherein the polymerization of poly(arylene sulfide) is carried out in the presence of a thermoplastic hydrogenated conjugated diene/monovinyl arene block copolymer in an amount sufficient to improve physical properties.

Further in accordance with the invention a homogeneous polymer composition is provided comprising poly(arylene sulfide) and a thermoplastic elastomeric hydrogenated conjugated diene/monovinyl arene block copolymer in an amount sufficient to improve at least one of tensile strength, impact resistance and flexural modulus. For the purpose of this invention the definition of an elastomeric is a polymer that has the property of being able to be extended by the application of a force to at least twice its length at room temperature, and then be able to retract to about the original length after cessation of said force.

In accordance with a specific embodiment of the invention, a polymer composition is prepared by (a) adding to a reaction zone a hydrogenated conjugated diene/monovinyl arene block copolymer, aqueous solutions of an alkali metal acetate, an alkali metal hydroxide, a sulfur source (preferably NaHS), and a polar solvent (preferably N-methylpyrrolidone), (b) dehydrating the mixture, (c) adding polyhalogenated aromatic compounds, (e.g., 1,4-dichlorobenzene), (d) subjecting the mixture to polymerization, and (e) recovering the polymer of improved properties. The production of poly(arylene sulfide) in the presence of hydrogenated conjugated diene/monovinyl arene block copolymer exhibits improved properties over similar compositions lacking the production in the presence of hydrogenated conjugated diene/monovinyl arene block copolymer.

The poly(arylene sulfide) resins, often abbreviated PAS, contemplated in the composition of this invention include those described in U.S. Pat. No. 3,354,129 and U.S. Pat. No. 3,919,177. The presently preferred polymer is poly(phenylene sulfide), often abbreviated PPS.

Generally the polymer reactants of the present invention when produced in the absence of the hydrogenated conjugated diene/monovinyl arene block copolymer form arylene sulfide homopolymers, copolymers, terpolymers, and the like having melting or softening points of at least 300° F. (149° C.), and more preferably from about 400° F. to about 900° F. (200° C.–482° C.). Other examples are poly(4,4'-diphenylenesulfide); poly(2,4-toluenesulfide); copolymer of p-dichlorobenzene and 2,4-dichlorotoluene, and the like. At present, the preferred reactants for use in the invention are the reactants that upon polymerization form poly(phenylene sulfide).

The thermoplastic conjugated diene/monovinyl arene block copolymer useful in this invention to modify physical properties in the arylene sulfide composition include those described in U.S. Pat. No. 3,595,942, U.S. Pat. No. 3,639,517, and U.S. Pat. No. 4,091,053, which are described as produced by the sequential polymerization of monovinyl-substituted aromatic hydrocarbons and conjugated dienes with the monomer ratio in a range of about 10 to 90 parts by weight conjugated diene to 90 to 10 parts by weight monovinyl aromatic. Multiple additions of initiators and monovinyl-substituted aromatic monomer with subsequent treatment with a polyfunctional treating agent form resinous branched block copolymers which are polymodal in regard to molecular weight distribution. The polymers useful in this invention are then hydrogenated to provide block copolymers in which at least 80 percent, preferably 85 percent, of the aliphatic double bonds have been hydrogenated while not more than 25 percent of the aromatic double bonds have been hydrogenated. Most preferably, about 99 percent of the aliphatic double bonds have been hydrogenated while less than 5 percent of the aromatic double bonds have been hydrogenated. Such hydrogenation is well known in the art and typical hydrogenation procedures are described in U.S. Pat. No. 4,088,626.

The preferred hydrogenated conjugated diene/monovinyl aromatic block copolymers are isoprene/styrene block copolymers or butadiene/styrene block copolymers that can contain up to about 50 percent by weight styrene block, preferably from about 10 to 50 percent by weight styrene block. These polymers will have a total average molecular weight typically on the order of about 25,000 to about 500,000, preferably from about 35,000 to about 300,000. The invention will be illustrated below using butadiene/styrene block copolymer.

While the desirable effects of producing poly(arylene sulfide) in the presence of any amount up to and over about 30 percent by weight of hydrogenated conjugated diene/monovinyl arene block copolymer would be sufficient to improve the properties of the resulting poly(arylene sulfide) product, the preferred range of copolymer is about 1 to 5 percent by weight.

As is usual in polymeric compositions and blends based on poly(arylene sulfide), a variety of other additives can be used in minor amounts of up to about 3 percent by weight of the total composition. These additives include such materials as flow improving (processability) agents, inorganic fillers, and pigments. Compatible processability agents can be selected from among solid ethylene copolymers (see U.S. Pat. No. 4,134,874), saturated fatty acids, such as zinc stearate, and the N,N'-alkylene bis(alkanamides), glycerides and phosphated glycerides of saturated fatty acids containing from about 10 to 30 carbon atoms, mono- and dialkanol amides derived from saturated fatty acids and esters derived from a saturated long chain fatty acid and long-chain saturated aliphatic alcohol. General fillers such as lithium carbonate are also suitable as processability agents and mold corrosion inhibitors. Suitable fillers are glass fibers, amorphous silica, and mica.

Polymer compositions prepared according to this invention are superior in physical properties as compared to polymer compositions made by blending the polymers together after the poly(arylene sulfide) is already prepared.

Compositions of this invention can be used in many applications such as: molding, encapsulating, sheet and film extrusion, fiber extrusion, lamination and the like.

The examples following should be taken as exemplary and not exclusive in illustrating the invention.

EXAMPLE I

In this example the preparation of poly(phenylene sulfide) (PPS) in the presence of a hydrogenated butadiene-styrene copolymer is described. 1001 grams of sodium sulfide in an aqueous solution, 197 grams of sodium acetate, 11.2 grams of sodium hydroxide, 45.0 grams of Solprene ®512 (a hydrogenated butadiene-styrene copolymer having a weight ratio of bound butadiene to styrene of 70:30, a number average molecular weight Mn=95,000, and a vinyl content before hydrogenation of less than 30 percent, marketed by Phillips Petroleum Company) and 2130 ml of N-methylpyrrolidone (NMP) were charged to a stirred two-gallon stainless steel reactor. The reactor contents were heated to about 235° C. under pressure and then rapidly cooled to about 162° C. during a time period of almost 1 hour. Subsequently, the pressure was reduced to essentially atmospheric pressure, and about 390 ml of water were distilled off by heating the reactor to a final temperature of 216° C. during a time span of about 30 minutes.

After the dehydration was completed, 1172.7 grams of p-dichlorobenzene (DCB), 2.72 grams of 1,2,4-trichlorobenzene (TCB), 36.0 grams of water and 430 ml of NMP were added. The reactor mixture was heated for 2 hours at 235° C. and for 3 hours at 265° C. while stirring. It was allowed to cool overnight, and formed polymer was separated from the NMP solution by decantation. The polymer was washed with hot tap water, collected on a sintered glass filter, washed with more hot water and acetone, and finally dried in an air oven at about 150° C. for 3 to 4 hours. This polymer composition was labeled Run 1.

A control PPS polymer (Run 2) was prepared according to essentially the same procedure as described above, with the exception that Solprene ®512 was not present during the polymerization. Only about 340 ml of water were distilled off.

EXAMPLE II

Properties of an injection molded blend of PPS and 5 percent by weight of Solprene ®512 (Run 1) prepared according to the process of Example I are compared in Table I with those of PPS resin without Solprene ®512 (Run 2). The polymer compositions of both runs were injection molded in an Arbury Allrounder Model 221E/150 injection molding machine having a 1" screw diameter. Molding conditions were: barrel temperature of 316° C.; mold temperature of 50° C.; screw speed of 220 r.p.m.; pressure of 825 psig; cycle time of 40 seconds; minimum back pressure; shot weight of 16.5 grams.

TABLE I

|  | Not Annealed | | Annealed 2 Hours at 204° C. | |
| --- | --- | --- | --- | --- |
|  | Run 1 (Invention) | Run 2 (Control) | Run 1 (Invention) | Run 2 (Control) |
| Melt Flow[a], g/10 min | 51.2 | 56.4 | — | — |
| Ash, Weight-% | 0.52 | 0.17 | — | — |
| Inherent Viscosity[b] | 0.32 | 0.33 | — | — |
| Density, g/cc | 1.322 | 1.319 | 1.355 | 1.360 |
| Shore D Hardness[c] | 83 | 82 | 85 | 88 |
| Tensile at Yield,[d] Mpa | 65.5 | 55.5 | 92.0 | 86.1 |
| Tensile at Break,[d] MPa | 58.0 | 49.2 | 84.3 | 69.6 |
| Elongation[d], % | 198 | 203 | 17 | 23 |
| Izod Impact[e], unnotched, J/M | 2175 | 630 | 460 | 447 |
| Flexural Modulus,[f] MPa | 2606 | 2468 | 3447 | 3461 |

[a]Determined at 316° C. according to a modified ASTM D 1238 procedure using a total load of 5.0 Kg (including the weight of the piston);
[b]Determined at 206° C. in 1-chloronaphthalene at a polymer concentration of about 0.4 g/100 ml, essentially in accordance with ASTM D1243;
[c]Determined according to ASTM D2240 by means of Type D Shore durometer;
[d]Determined according to ASTM D638;
[e]Determined according to ASTM D256;
[f]Determined according to ASTM D790.

Data in Table I show that the blend of PPS and 5 percent by weight of hydrogenated butadiene-styrene copolymer (Run 1) has higher tensile strength, flexural modulus and Izod impact, before and after annealing, than unmodified PPS (Run 2).

EXAMPLE III

In this example a PPS/Solprene ®512 blend (Run 3) prepared essentially in accordance with the procedure of Example I, with the exception that 5.43 grams of TCB (instead of 2.72 grams) were added to the reactor after dehydration, is compared with PPS without Solprene ®512 containing the same amount of TCB comonomer (Run 4). Pertinent properties of injection molded specimens (see Example II for molding conditions) are listed in Table II.

TABLE II

|  | Not Annealed | | Annealed 2 Hours at 204° C. | |
|---|---|---|---|---|
|  | Run 3 (Invention) | Run 4 (Control) | Run 3 (Invention) | Run 4 (Control) |
| Melt Flow[a], g/10 min | 3.2 | 2.5 | — | — |
| Ash, Weight-% | 0.09 | 0.08 | — | — |
| Inherent Viscosity[a] | 0.52 | 0.52 | — | — |
| Density, g/cc | 1.339 | 1.346 | 1.354 | 1.362 |
| Shore D Hardness[a] | 85 | 86 | 84 | 87 |
| Tensile at Yield[a], MPa | 89.5 | 75.5 | 99.9 | 94.8 |
| Tensile at Break[a], MPa | 96.0 | 84 | 108.3 | 105 |
| Elongation[a], % | 66 | 108 | 31 | 32 |
| Izod Impact[a], Unnotched, J/m | 1368 | No Break[b] | 810 | 414 |
| Flexural Modulus[a], MPa | 3502 | 3061 | 3957 | 3854 |

[a]See footnotes to Table I.
[b]Questionable result.

Data in Table II show higher tensile strength and flexural modulus, before and after annealing, and higher Izod impact after annealing for PPS/Solprene ®512 blends, thus confirming the results of Table I.

EXAMPLE IV

Another hydrogenated butadiene-styrene copolymer, Phil-Ad ®VII, a viscosity index improver marketed by Phillips Petroleum Company, containing 41 percent by weight of butadiene and 59 percent by weight of bound styrene as block polystyrene and having a number average molecular weight Mn of about 67,000, was added to the PPS reactor in accordance with the procedure described in Example I.

PPS and Phil-Ad ®VII appeared visibly compatible. However, the melt flow of blends of Phil-Ad ®VII and PPS was much higher than that of pure PPS as is shown in Table III and thus not suitable for most intended applications. PPS of all three runs contained 0.3 mole-% of TCB.

TABLE III

| Run | Added Phil-Ad VII Weight-% | Melt Flow[a] (g/10 minutes) | Inherent Viscosity | Ash Weight-% |
|---|---|---|---|---|
| 5 | 0 | 1.0 | 0.47 | 0.27 |
| 6 | 5.0 | 1294 | 0.20 | 0.07 |
| 7 | 10.0 | [b] | 0.16 | 0.50 |

[a]See footnotes to Table I.
[b]Too fluid to measure.

EXAMPLE V

In this example two polymer compositions containing 95 weight-% PPS of comparable melt flow and 5 weight % Solprene 512 rubber are compared. The invention composition used for comparison was Run 1 of Examples I and II. The control composition was a blend of Ryton R-6 (pelletized by Phillips Petroleum Corp., Bartlesville, OK) and 5 weight-% Solprene 512. These two components were blended in a Brabender Plasticorder at a temperature of about 316° C. The blending was done under nitrogen to minimize oxidative degradation and curing. PPS was first plasticized in the Plasticorder for about two minutes. Then Solprene 512 was added, and the mixture was blended for about 4 minutes at about 316° C. This control blend is labeled Run 8.

Pertinent properties of injection molded specimens of both polymer compositions are listed in Table IV. Molding conditions were essentially the same as those described in Example II.

TABLE IV

|  | Run 1 (Invention) | | Run 8 Control (Blended 316° C.) |
|---|---|---|---|
|  | Not Annealed | Annealed (2 Hrs., 204° C.) |  |
| Melt Flow | 51.2 | — | 29 |
| Tensile Strength at Yield, MPa | 65.5 | 92.0 | 70.4 |
| Tensile at Break, Mpa | 58.0 | 84.3 | 61.7 |
| Elongation, % | 198 | 17 | 15 |
| Izod Impact, Unnotched, J/M | 2175 | 460 | 149 |
| Flexural Modulus, MPa | 2606 | 3447 | 3010 |
| Shore D Hardness | 83 | 85 | 85 |

Data in Table IV clearly show the impact superiority of Invention Run 1 (both annealed and unannealed) versus Control Run 8.

I claim:

1. A process for the production of a polymer composition which comprises producing poly(arylene sulfide) by interreacting under polymerization conditions at least one polyhalogenated aromatic, a sulfur source and an organic polar solvent in the presence of a thermoplastic elastomeric hydrogenated conjugated diene/- monovinyl arene block copolymer in an amount sufficient to improve at least one of tensile strength, impact resistance, and flexural modulus.

2. A process according to claim 1 wherein the weight ratio of said block copolymer to poly(arylene sulfide) is from about 1:99 to 30:70.

3. A process according to claim 1 wherein said poly(arylene sulfide) is poly(phenylene sulfide).

4. A process according to claim 1 wherein said block copolymer is hydrogenated butadiene/styrene copolymer having a weight ratio of bound butadiene to styrene ranging from about 90:10 to 50:50.

5. A process according to claim 4 wherein the final product is annealed.

6. A homogeneous polymer composition produced according to the process of claim 1.

7. A composition according to claim 6 wherein said poly(arylene sulfide) is poly(phenylene sulfide) and the weight ratio of block copolymer to poly(phenylene sulfide) is from about 1:99 to 30:70.

8. A composition according to claim 7 wherein said block copolymer is hydrogenated butadiene/styrene copolymer having a weight ratio of bound butadiene to styrene ranging from about 90:10 to 50:50.

9. A composition according to claim 8 wherein the weight ratio of bound butadiene to styrene in said copolymer is about 70:30.

10. A composition according to claim 8 wherein the weight ratio of copolymer to poly(phenylene sulfide) is about 5:95.

11. A composition according to claim 8 wherein the vinyl content of said block copolymer before hydrogenation is less than about 30% based on the total possible vinyl content of the block copolymer.

12. A composition according to claim 8 wherein the aliphatic unsaturation of said block copolymer after hydrogenation is less than about 5%.

13. A composition according to claim 8 wherein the final product is annealed.

14. A process for the production of a polymer composition which comprises
(a) admixing in a reaction zone at least one polyhalogenated aromatic, a sulfur source, an organic solvent and at least about 1 weight percent of a thermoplastic elastomeric hydrogenated conjugated diene/monovinyl arene block copolymer, and
(b) subjecting the reactants and said copolymer in (a) to polymerization conditions to form a polymer composition exhibiting an improvement in at least one of tensile strength, impact resistance, and flexural modulus.

15. A process according to claim 14 wherein said polyhalogenated aromatic is selected from dichlorobenzene and trichlorobenzene and said copolymer is butadiene/styrene.

16. A process for the production of a polymer composition which comprises
(a) admixing in a reaction zone a thermoplastic elastomeric hydrogenated conjugated diene/monovinyl arene block copolymer, a sulfur source, an aqueous alkali metal hydroxide solution and a polar solvent,
(b) dehydrating the mixture of (a),
(c) adding to the mixture of (b) at least one polyhalogenated aromatic compound,
(d) subjecting the mixture of (c) to polymerization conditions, and
(e) recovering a polymer composition exhibiting an improvement in at least one of tensile strength, impact resistance, and flexural modulus.

17. A process according to claim 16 wherein the sulfur source is NaHS, the polar solvent is N-methylpyrrolidone, and the polyhalogenated aromatic compounds are p-dichlorobenzene (DCB) and 1,2,4-trichlorobenzene (TCB) where said TCB is in an amount sufficient to increase the molecular weight of the final product to aid processability.

18. A process according to claim 16 wherein the weight percent of block copolymer in the total final polymer composition is from about 1 to about 30 weight percent, and said block copolymer is hydrogenated butadiene/styrene having a weight ratio of bound butadiene to styrene ranging from about 90:10 to 50:50.

19. A process according to claim 18 wherein the weight ratio of bound butadiene to styrene in said copolymer is about 70:30, and the vinyl content before hydrogenation is less than about 30% based on the total possible vinyl content of the block copolymer.

20. A process according to claim 18 wherein the final product is annealed, and the weight percent of block copolymer in the total final polymer composition is about 5 weight percent.

* * * * *